May 10, 1955 P. H. PLANETA 2,708,037
COMBINATION DRAINER BASKET AND RECEPTACLE SUPPORT
Filed May 20, 1952
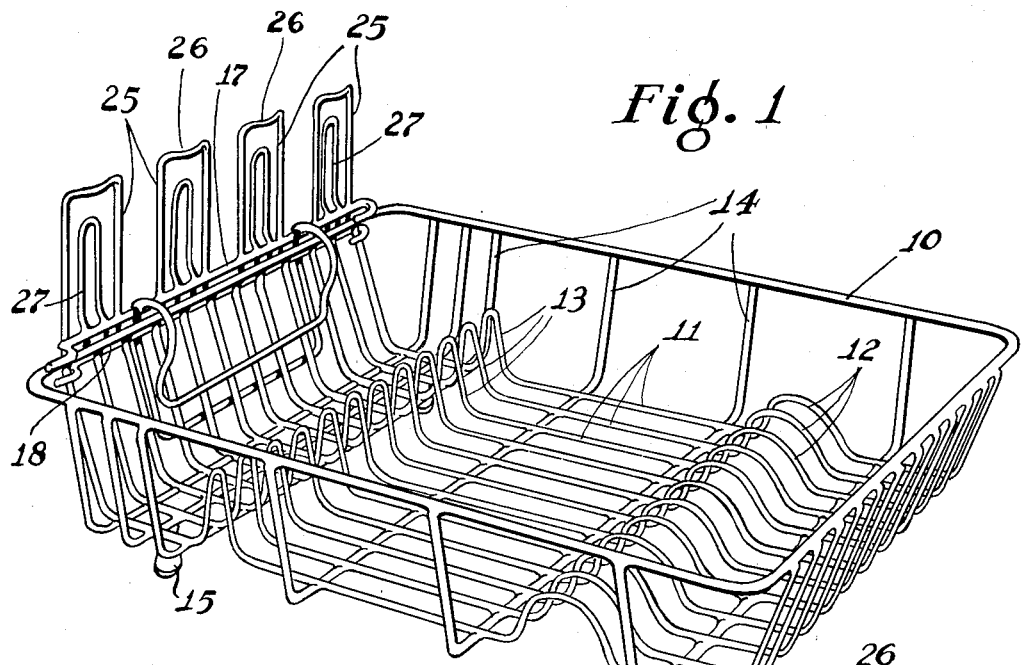
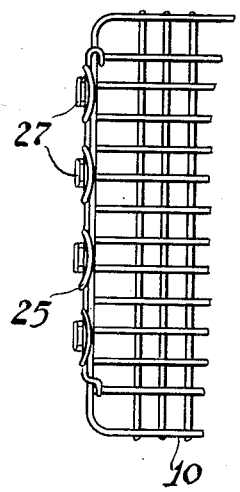
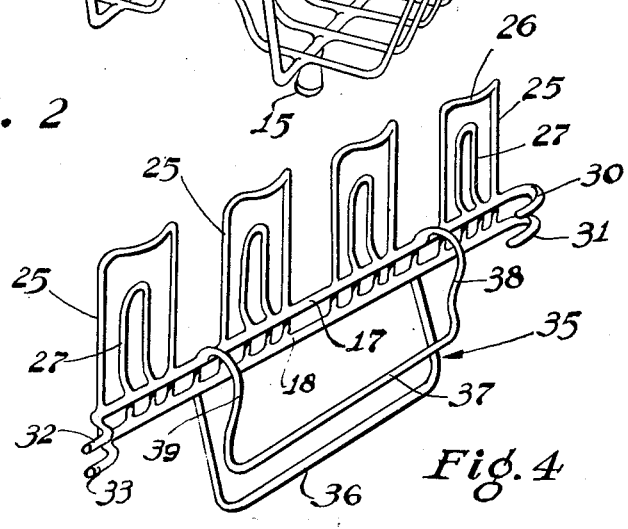
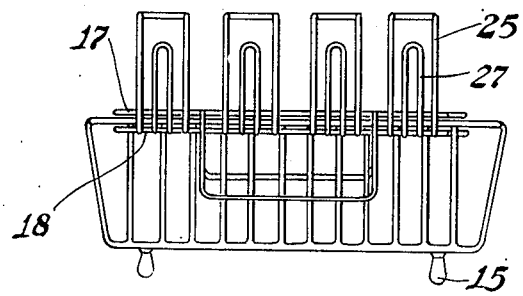
INVENTOR.
Paul H. Planeta
BY
William A. Zalesak
ATTORNEY

United States Patent Office 2,708,037
Patented May 10, 1955

2,708,037

COMBINATION DRAINER BASKET AND RECEPTACLE SUPPORT

Paul H. Planeta, East Hampton, Conn.

Application May 20, 1952, Serial No. 288,797

3 Claims. (Cl. 211—74)

My invention relates broadly to dish drainers which may be of the wire rack type and to certain improvements therein, more particularly receptacle drainer supports.

The present application describes and claims an improvement over that described and claimed in my copending application, Serial No. 141,889, filed February 2, 1950, which has now become abandoned.

In one form of dish drainer of the wire rack type a rectangular or square shaped basket is formed of a plurality of longitudinally extending wires and transverse cross wires, the free ends of which extend upwardly and terminate in an upper rim. The longitudinal wires of the rack are usually formed to maintain plates in substantially vertical position or tilted at a slight angle for draining. A silver tray is usually formed at one end by properly forming the longitudinally extending wires. Usually no provision has been made to provide specifically for draining glasses or cups which, if placed in the rack or tray, reduce the capacity of the rack and subject the cups and glasses to damage from hard silver and metal implements or heavy plates. If provisions are made for cups and glasses out of the way of silver and dishes, the rack becomes large and cumbersome and difficult to ship and store.

There was up to the time of my prior invention nothing available which could be easily attached to existing devices or drainers for supporting cups and glasses out of the way and in a position where they would readily drain and dry. While some effort has been made to provide means for draining glasses secured to trays of the kind described, these have not been detachable and have been cumbersome and produce difficulties in storing.

In accordance with my prior application described above, I provide a detachable rack arrangement which can be secured to the rim of the drainer basket or rack and on which cups and glasses could be readily supported for draining. The present application describes and claims an improvement in the above mentioned arrangement. Very small receptacles, as well as conventional size cups and glasses, can be readily drained and firmly supported outside the basket and thus additional space is provided for supporting plates and silver within the basket. In addition, improvements have been made in the means for detachably securing the glass or receptacle drainer rack to the rim of the basket proper, and simplifying the rack so that it can be attached to one edge of any conventional wire rack drainer.

It is, therefore, a principal object of my invention to provide an improved receptacle support for a dish drainer.

A further object of my invention is to provide such a rack for supporting glasses or cups and which can be readily supported on a drainer basket and which can be removed readily when not in use.

A still further object of my invention is to provide a support for glasses, cups and the like, which can be easily attached and detached and which can be easily stored with the drainer or left detached when not in use, but which can be readily secured in place when in use.

Another object of my invention is to provide a detachable support for a drainer basket which protects glasses, cups and the like and which facilitates draining and drying.

Another object of my invention is to provide a combination drainer basket and receptacle support which can be taken apart for easy shipment and storage.

Another object of my invention is to provide a support for glasses, cups and the like which, in addition to being easily attached and detached, can be made self-locking and can be easily fabricated.

A more specific object of my invention is to provide a combination drainer basket and rack having simplified means for securing the two together.

Another object of my invention is to provide a rack having means for supporting receptacles of various shapes and sizes and for the most part outside of the confines of the drainer basket.

Another object of my invention is to provide a simple detachable rack of the kind described which can be secured along one side of the conventional wire dish drainer and can be securely fixed and locked thereto.

Briefly, my invention includes a supporting rack including a pair of spaced rod-like drainer basket rim engaging members which can be secured to the top rim of the conventional drainer basket and which has extending therefrom supports over which glasses, cups and the like of various sizes can be placed in inverted positions for draining purposes.

My device is constructed so that the upper rim member of the basket, whether of the wire rack type or other type, is received between spaced members of the supporting rack. The rack is provided with means for securing the ends of the rack to the rim of the basket, but which nevertheless permits easy attachment thereto and detachment therefrom. The device is also provided with a spring clip for locking the device to the basket and insuring proper positioning thereof on the basket.

The novel features of my invention will best be understood by reference to the following description taken in connection with the accompanying drawing in which Fig. 1 is a perspective view of a drainer basket incorporating a supporting rack for glasses, cups and the like and made according to my invention; Fig. 2 is a partial plan view of the structure shown in Fig. 1; Fig. 3 is an end elevation of Fig. 1; and Fig. 4 is a perspective view showing details of the supporting rack shown in Fig. 1.

The usual drainer basket is provided as shown in Fig. 1 with top rim member 10 and a plurality of longitudinally extending cross elements 11 having upwardly turned ends secured to the rim. Intermediate portions 12 are arcuate-shaped, up-turned and tilted at an angle to support plates therebetween, the upturned portions 13 providing between them and the end of the basket a silver tray. Transverse members 14 have upwardly turned ends secured to the rim member 10 and extend across and are secured by welding, for example, to the longitudinally extending member 11. Members 15 provide feet. The whole drainer basket may be coated with plastic material or rubber to protect dishes and also to serve as a rust preventive coating for the drainer basket.

In accordance with my invention, I provide a detachable glass or tumbler supporting rack including parallel spaced members 17 and 18 formed to conform with the drainer basket rim with which the device is used. The device can be used for baskets made of apertured material of sheet form provided the basket includes a rim or lip member to which the rack may be attached. The upper rim member 10 of the drainer basket is received between the two members 17 and 18.

The support has a plurality of inverted U-shaped members 25 having ends 26 lying in planes transverse to the longitudinal axis of the U-shaped member. The ends of the U-shaped member extend transversely of the members 17 and 18 to secure these members together, preferably by welding, and form a tight bracing action. These members 25 can support cups and larger glasses so that the major portion of the glass lies outside of the drainer basket, making the interior freely accessible for plates and silver to be placed therein. In order to provide for smaller glasses and small receptacles, such as one ounce glasses, and tall thin glasses of small diameter, I provide inner U-shaped members 27 lying in a plane offset with respect to the plane of the legs of members 25. There is a slight flexibility between the legs of members 25 and 27 so that the rim of the small diameter glasses can be gripped between the two elements and firmly held in place while draining. These can of course also be used to clamp the lips of larger glasses or cups so that for draining, they lie entirely outside the basket.

Referring to Fig. 4, it will be noted that the rod-like elements 17 and 18 are provided with the hooked-shaped ends 30, 31, and inwardly extending offset portions 32, 33 having thin end portions parallel to the main portions of the rod-like elements. These hooked ends and offset portions extend within the boundaries of the rim member 10 of the basket and engage upright end portions of some of the members 11 to secure the rack to the rim member. Since the rack is straight and does not engage more than one side of the basket, I provide a wide supporting clamp 35 of rod-like material having an outer jaw 36 conforming to the slope of the side of the basket drainer and an inner jaw 37 having loops 38 and 39 to give the clamp resiliency. The inner jaw contacts the inside of the basket. The jaw portion 36 is therefore in a plane at an angle to the plane of elements 25 and 27.

The clamp maintains the rack in a vertical position and provides a sufficient clamping action on the side of the basket to prevent accidental sliding of the rack along the rim to permit accidental detachment of the rack. To release the rack, it is pushed along the rim to release the hooks and offset portions from engagement with the members 11 and the rack may then be pulled outwardly to clear the rim 10 and upwardly to release the clamp 35 from the sides of the basket. The rack can of course be used with any basket having a sufficiently wide rim to be received between members 17 and 18 and the ends 30, 31 and 32, 33.

A device made according to my invention has all of the advantages pointed out above. It increases the capacity of the basket by providing supporting units outside of the basket proper to support receptacles, the larger portion of which lie outside the rim of the basket. The rack may be easily attached and detached and readily stored when not in use and when it is desired to ship the device including basket and racks in nested arrangement. The rack is securely locked in position when placed on the basket and when supporting glasses in inverted position draining and drying is facilitated. The rack permits support of all types and sizes of glasses, cups and other receptacles in a secure manner.

I have indicated the preferred embodiments of my invention.

I claim:

1. A device for use with a drainer basket having a rim member, comprising a detachable supporting rack to be attached to said rim member, said supporting rack including a pair of closely spaced rod-like elements for receiving said rim therebetween, a plurality of transversely extending supporting elements lying in a common plane and attached to said rod-like elements, the ends of said rod-like elements having fastening means at the ends thereof, and a spring clip extending from said rod-like elements in a direction opposite said transversely extending elements for engaging the inside and outside surfaces of a side of said drainer basket for securing and positioning said rack on said basket.

2. A detachable supporting rack for a drainer basket having a rim, said supporting rack including a pair of closely spaced rod-like elements for receiving said rim member therebetween, a plurality of transverse supporting elements attached to rod-like elements, said plurality of transversely extending supporting elements lying in a common plane, means on said rod-like elements for securing the rack to said rim member, said means including a clamp of rod-like material and having comparatively wide jaws for clamping opposite faces of one side of said drainer basket, the outside jaw lying in a plane parallel to the plane of the side of the basket and the inside jaw being provided with loops for providing resiliency for said clamps.

3. A detachable supporting rack for a drainer basket having a rim, said supporting rack including a pair of closely spaced rod-like elements for receiving said rim therebetween, a plurality of transverse supporting elements attached to said rod-like elements, said plurality of transverse supporting elements lying in a common plane, means on said rod-like elements for securing the rack to said rim member, said means including a clamp of rod-like material and having comparatively wide jaws for clamping opposite faces of one side of said drainer basket, one of said jaws lying in a plane parallel to the plane of said one side of said basket and the other of said jaws having loops for providing resiliency to the jaws of said clamp.

References Cited in the file of this patent

UNITED STATES PATENTS

| | | |
|---|---|---|
| D. 164,197 | Planeta | Aug. 7, 1951 |
| 846,911 | Crump | Mar. 12, 1907 |
| 974,865 | Dreher | Nov. 8, 1910 |
| 1,986,935 | Levine | Jan. 8, 1935 |